Aug. 14, 1945.  C. W. WARREN  2,382,925
VARIABLE ARC ROTARY ACTUATOR
Filed Oct. 5, 1944  2 Sheets-Sheet 1

INVENTOR
CHARLES W. WARREN
BY *Geo. A. Senior*
ATTORNEY

Aug. 14, 1945.     C. W. WARREN     2,382,925
VARIABLE ARC ROTARY ACTUATOR
Filed Oct. 5, 1944     2 Sheets-Sheet 2

INVENTOR
CHARLES W. WARREN

BY *Geo. A. Senior*
ATTORNEY

Patented Aug. 14, 1945

2,382,925

UNITED STATES PATENT OFFICE 2,382,925

VARIABLE ARC ROTARY ACTUATOR

Charles W. Warren, North Plainfield, N. J.

Application October 5, 1944, Serial No. 557,326

4 Claims. (Cl. 172—277)

This invention relates to electric actuators for imparting motion to parts in response to excitation by an electric current.

It is an object of the invention to provide an improved apparatus for exerting force through a substantial angle of rotation, and more particularly through an arc of distance that can be varied to suit the particular requirements of the apparatus with which the invention is to be used.

Other objects are to obtain in such apparatus a substantially constant force through a predetermined angle of movement and a cessation of the force after completion of a predetermined arc of movement without interrupting the supply of electric current to the apparatus. In the preferred embodiment of the invention the electric current acts to stop movement of the parts at a given limit and the stopping is sudden and at a definite location. By making use of a reversal of torque of the moving parts the apparatus is made to stop almost as if it struck a rigid mechanical abutment.

One feature of the invention relates to adjustable means for determining the angle through which the apparatus moves before coming to a stop. The apparatus remains in a displaced position as long as electric current is supplied. When the power is shut off, the parts return automatically to their starting position.

Other objects, features and advantages of the invention will appear or be pointed out as the description proceeds.

In the drawings forming a part hereof in which like reference characters indicate corresponding parts in all the views, Figure 1 is a vertical sectional view taken on the line 1—1 of Figure 2, showing the preferred embodiment of the invention.

Figure 1:
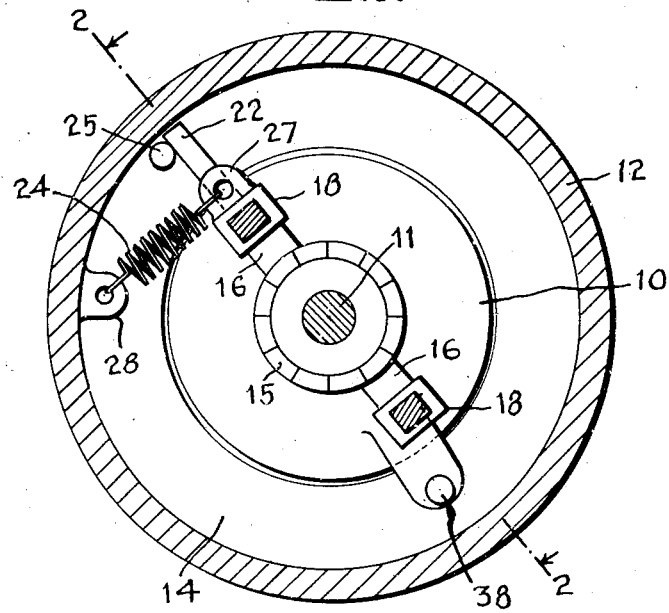

The preferred embodiment of the invention comprises a repulsion motor having a rotor 10 on a rotor shaft 11 that turns in bearings in a frame 12. The magnetic field is generated by windings of a stator 14. The machine has a commutator 15 and two brushes 16 that are short-circuited.

The brushes 16 are in a brush holder 18 which is rotatably supported on the rotor shaft 11. The brush holder 18 is restrained against axial movement along the rotor shaft by the commutator 15 at one end and by a collar 19 on the other side. The collar 19 is rigidly connected to the shaft 11 or may be integral with the shaft 11. The brush holder 18 has an extension 22 at its upper end. A spring 24 pulls the brush holder 18 in a counterclockwise direction in Figure 1 and holds the extension 22 against a stud 25 that extends out from the stator 14 or some other stationary part of the machine. The spring 24 connects at one end with a tab 27 of the brush holder 18 and is connected at the other end to a lug 28 extending inward from the frame of the motor.

The stator field is located so that the flux axis is vertical in the motor shown in Figure 1. The brushes 16 lie along a line that makes an angle of approximately 43 degrees with the flux axis. This is the brush angle that produces the maximum motor torque.

Figure 2:
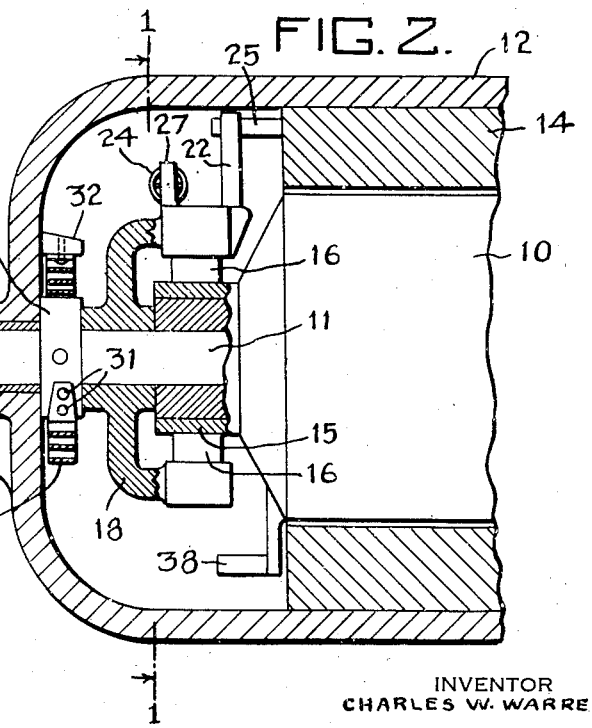
Figure 2 is a sectional view taken on the line 2—2 of Figure 1.
Figure 3:
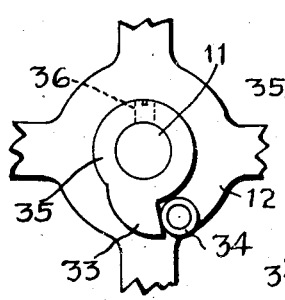
Figure 3 is a fragmentary detail view illustrating the stop mechanism shown in Figure 2.

A spring 30 has its inner end connected by fastenings 31 to the collar 19 of the rotor shaft 11, and the outer end of the spring 30 is secured to a fixed projection 32 on the end of the motor frame. This spring is wound so that it tends to rotate the rotor 10 in a counterclockwise direction in Figure 1. The spring 30 has sufficient convolutions so that the rotor shaft can be rotated for 360 degrees in a clockwise direction without substantially increasing the torque exerted by the spring 30. Rotation of the rotor shaft 11 by the spring 30 is limited by a stop 33 that comes against a pin 34 (Figures 2 and 3).

The pin 34 extends out from the motor frame 12, and the stop 33 is an integral part of a collar 35 that fits over the outer end of the rotor shaft 11. A set screw 36 holds the collar 35 on the rotor shaft 11 so that the collar and shaft turn as a unit.

There is a pin 38 extending out from the rotor 10 in position to contact with the extension 22 of the brush carriage 18. This pin 38 is at sufficient radial distance from the shaft 11 so that it will pass over the lower portion of the brush holder 18 without striking the brushholder, but whenever the rotor 10 has turned far enough to bring the pin 38 around to the extension 22 of the brush holder, further rotation of the rotor causes the brush holder 18 to move as a unit with the rotor.

As the brush holder 18 is moved to a vertical position that brings the brushes 16 in line with the flux axis of the motor, the torque of the motor decreases to zero. If the brush holder 18 moves beyond a vertical position, as the result of inertia of the rotor and other moving parts, the direction of the motor torque is reversed and the rotor will tend to turn counterclockwise. The magnitude of this reversed torque builds up very fast as the brushes 16 are moved further beyond the flux axis. It is apparent, therefore, that the reversed torque of the motor serves as a brake to prevent movement of the rotor beyond the position that locates the brushes in a vertical line, and that the braking torque increases with the amount of over-travel of the rotor and brush holder beyond the zero-torque position.

This characteristic of the invention is advantageous because it gives the machine a definite stopping position, and the apparatus stops automatically.

It is not necessary for an operator to shut off the power. In this respect the machine is similar to a conventional solenoid which moves its plunger to a mid-position at which the forces balance even though the excitation of the solenoid remains constant.

When the apparatus is set to move through an angle of less than 43 degrees, the pin 38 is against the brush holder extension 22 during the entire movement of the rotor. For greater angles of operation, the rotor turns until the pin 38 strikes the extension 22 of the brush holder and then turns through the additional 43 degrees necessary to move the brushes into line with the flux axis. This feature of having the pin 38 travel for a portion of its angular movement before striking the brush holder, when operating through angles greater than 43 degrees, provides in effect a lost motion connection between the rotor 10 and the brush holder 22.

The starting position of the pin 38 depends upon the adjustment of the collar 35 on the rotor shaft 11. The collar 35 can be adjusted by loosening the set screw 36 and turning the rotor shaft 11 until the pin 38 is in the desired starting position. The rotor is held in such position while the collar 35 is turned until the stop 35 comes against the pin 34. The set screw 36 is then tightened. After each operation of the motor the spring 30 will bring the rotor 10 and shaft 11 back to this same starting position in which the stop 33 comes against the stop pin 34.

With the parts adjusted so that the starting position of the pin 38 is the position shown in Figure 1, the rotor 10 and shaft 11 rotate for approximately 150 degrees at substantially constant torque and then for a final 43 degrees at progressively declining torque.

Figure 4:
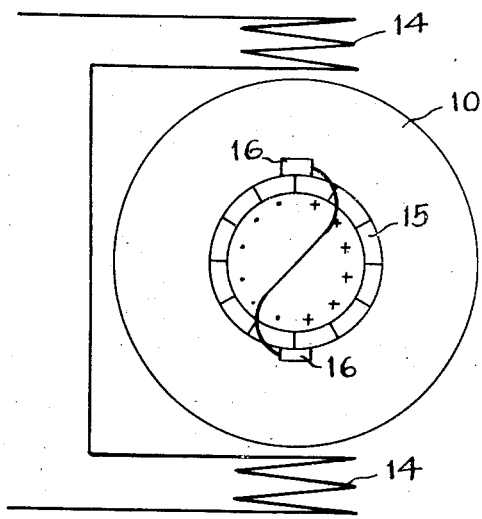
Figures 4 and 5 are diagrams illustrating the principle of operation of the apparatus shown in the other views.
Figure 5:
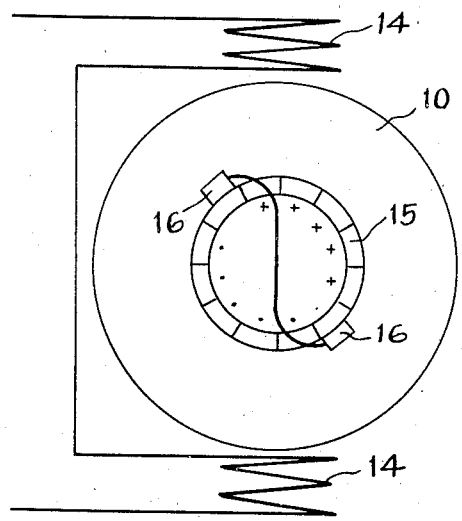

Figures 4 and 5 illustrate the principle of the machine shown in Figures 1 to 3. The dots and crosses around the commutator 15 represent the direction of current in the different conductors of the rotor. It will be apparent that when the brushes 16 are in line with the flux axis of the machine, as shown in Figure 4, half of the conductors on each side of the flux axis carry current in each direction thus producing a zero torque. When the brushes 16 are shifted 43 degrees to the left, as shown in Figure 5, the conductors are no longer balanced with respect to the flux axis of the machine and a substantial torque is developed. The invention can be constructed with the flux axis disposed so that the rotor is brought to a stop by movement of the brushes to a line at right angles to the flux axis instead of in line with it. Both positions produce zero torque and movement beyond each position reverses the torque.

Figure 6:
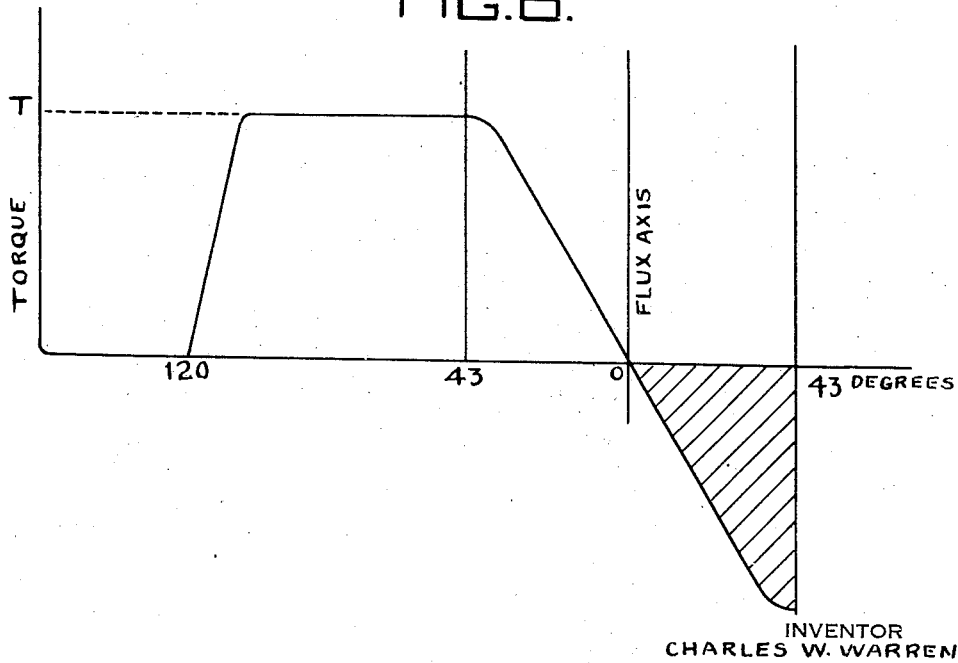
Figure 6 is a graph showing the force exerted by the apparatus illustrated in the other views.

Figure 6 illustrates the torque exerted by the rotor shaft 11. In this graph the starting position of the pin 38 is approximately 120 degrees, measured counterclockwise from the top of the machine. When current is supplied to the machine, the torque rises rapidly to a value T as the rotor begins to move and this torque is maintained substantially constant until the pin contacts with the brush holder at the 43 degree position. Further movement of the rotor shifts the brush holders and causes the torque to decline, as illustrated in the graph, to a zero value at the flux axis. Continued movement of the rotor shifts the brushes beyond the zero torque position and causes the negative or braking torque represented by the shaded area of the graph. This negative torque is carried all the way to its maximum value in Fig. 6 for purposes of illustration, but in actual practice the reversed torque, coupled with the force exerted by the spring 24, causes the armature to stop quickly when the brushes reach the flux axis.

When the rotor stops, it backs up to the flux axis if there has been some overtravel such as usually occurs because of inertia. The springs 24 and 30 move the rotor back a little beyond the flux axis, the exact amount depending upon the strength of these springs, but for any adjustment of a particular embodiment of the invention, the rotor always stops at the same place.

The preferred embodiment of the invention has been illustrated and described, but it will be apparent that numerous modifications can be made and some features of the invention can be used without others and without departing from the invention as defined in the claims.

I claim as my invention:

1. An electric actuator comprising a repulsion motor having a flux axis, brushes, a brush holder that positions the brushes along a line that makes an acute angle with the flux axis, a support on which the brush holder is movable to shift the brushes with respect to the flux axis to a position that reduces the motor torque and stops the motor, and motion-transmitting means by which the motor moves the brush holder in the direction that decreases the motor torque.

2. A rotary actuator including a repulsion motor having brushes, a brush holder movable to shift the brushes from a position at an acute angle to the flux axis of the motor to a position substantially in line with the flux axis, an abutment on the motor rotatable as a unit with the rotor of the repulsion motor, and a contact portion of the brush holder in the path of movement of said abutment for shifting the brushes toward the flux axis after the abutment moves far enough to strike the contact portion of the brush holder.

3. An electric actuator comprising a repulsion motor, brushes on said motor, a brush holder movable to shift said brushes into line with the flux axis of the motor and thereby reduce the motor torque to zero, an abutment that turns with the motor and that moves the brush holder toward its zero torque position during the latter part of the rotation of the motor, and yielding means for restoring the motor and brush holder to their starting positions when current to the motor is shut off.

4. An electric actuator for moving a load through a variable arc of distance, said actuator comprising a repulsion motor having a rotor, brushes, and a brush holder that is movable to shift the brushes from a line that makes an acute angle with the flux axis of the motor to another position that reduces the torque of the motor to zero and to a further position that reverses the motor torque, spring means for holding the brush holder in a normal position that locates the brushes on the line at an acute angle to the flux axis, an abutment connected with the rotor and movable as a unit with said rotor in the direction that shifts the brush holder against its spring and into position to reduce and reverse the motor torque, said brush holder having a portion that extends into the path of the abutment on one side of the brush holder and on one side only so that the rotor can turn more than 180 degrees before said abutment strikes the brush holder, spring means for turning the rotor in a reverse direction after the power is shut off, and an adjustable stop for determining the limit of reverse movement of the rotor.

CHARLES W. WARREN.